(12) United States Patent
Funahashi

(10) Patent No.: US 7,933,032 B2
(45) Date of Patent: Apr. 26, 2011

(54) IMAGE FORMING APPARATUS

(75) Inventor: Hiroyuki Funahashi, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 1233 days.

(21) Appl. No.: 11/501,682

(22) Filed: Aug. 10, 2006

(65) Prior Publication Data
US 2007/0041033 A1    Feb. 22, 2007

(30) Foreign Application Priority Data

Aug. 19, 2005    (JP) .................. 2005-238654

(51) Int. Cl.
*G06K 15/00* (2006.01)
*G06F 3/12* (2006.01)
*G03G 15/00* (2006.01)

(52) U.S. Cl. ............. 358/1.14; 358/1.13; 358/1.15; 399/81; 399/85; 399/88

(58) Field of Classification Search .......... None
See application file for complete search history.

(56) References Cited

U.S. PATENT DOCUMENTS

| | | | |
|---|---|---|---|
| 5,001,655 A | | 3/1991 | Higano et al. |
| 5,848,318 A * | 12/1998 | Okimoto ............. 399/8 |
| 5,961,232 A | 10/1999 | Watanabe et al. |
| 6,249,658 B1 * | 6/2001 | Inui et al. ........... 399/82 |
| 6,473,192 B1 * | 10/2002 | Kidani et al. ........ 358/1.14 |
| 6,570,667 B1 * | 5/2003 | Hattori et al. ....... 358/1.15 |
| 6,734,985 B1 * | 5/2004 | Ochiai ............... 358/1.15 |

FOREIGN PATENT DOCUMENTS

| | | |
|---|---|---|
| JP | 1237180 | 9/1989 |
| JP | 10166666 | 6/1998 |
| JP | 2004-120318 | 4/2004 |
| JP | 2004-249486 | 9/2004 |

OTHER PUBLICATIONS

Office Action in connection with Japanese application No. 2005-238654, mailed Jun. 8, 2010.

* cited by examiner

*Primary Examiner* — Edward L Coles
*Assistant Examiner* — Hilina S Kassa
(74) *Attorney, Agent, or Firm* — Banner & Witcoff, Ltd.

(57) ABSTRACT

An image forming apparatus includes: a printing unit that performs a printing operation; a printing possibility determination unit that determines whether printing is possible, at the time of starting the printing operation; a printing stop unit that stops the printing operation, when the printing possibility determination unit determines that printing is impossible; a notification unit that notifies an error, when the printing operation is stopped; a notification time counting unit that counts a period in which an error is notified; a notification release unit that releases error notification, when the period in which an error is notified by the notification unit is counted for a predetermined time; and a stopped state reset unit that returns a stopped state of the printing unit whose printing operation is stopped, to a standby state before the printing unit performs the printing operation, when notification of an error is released.

14 Claims, 5 Drawing Sheets

FIG. 4

| | | |
|---|---|---|
| Paper | Duplex | = Off/On (Long Bind)/On (Short Bind) |
| Quality | Resolution | = 300/600 dpi |
| | Toner Save | = Off/On |
| Setup | Language | = English/Japanese/French/German |
| | Error Buzzer | = Off/On |
| | Buzzer Volume | = Low/High |
| | Error Alarm Time | = 1/3/5/10/30 min |
| | No-Touch Time | = 1/3/5/10 min |

IMAGE FORMING APPARATUS

CROSS-REFERENCE TO THE RELATED APPLICATION(S)

This application is based upon and claims priority from prior Japanese Patent Application No. 2005-238654 filed on Aug. 19, 2005, the entire contents of which are incorporated herein by reference.

TECHNICAL FIELD

This invention relates to an image forming apparatus such as a laser printer.

BACKGROUND

Conventionally, when an image forming apparatus, such as a laser printer or a facsimile machine, is sold, an image forming apparatus for demonstration at shops (hereinafter, referred to as "demo machine") is used so that customers have a better understanding about the product. The demo machine prints out a demo page on which features of the product are described through a simple key operation.

When an error, such as the demo machine running out of sheets, occurs, the demo machine notifies an error occurrence to a customer or a sales person by turning on an LCD, which is disposed on the demo machine, or by displaying error information on a liquid crystal panel.

In JP-A-1-237180, an inspection apparatus for a demo machine is disclosed. The inspection apparatus displays error information on a display unit, when a printer does not respond for predetermined time or more after printing data is outputted. Further, when a signal, such as "sheet empty" or "error stop" is transmitted from a printer side during a printing, a stop time is stored in a stop time storage circuit, and the time is displayed on the display unit.

SUMMARY

In JP-A-1-237180, there is no problem if a sales person can periodically check whether a printer is stopped through the use of the inspection apparatus. However, when the sales person is preoccupied with responses to customers does not have time for checking the inspection apparatus, or forgets to check it, there is a problem that the printer can be continuously stopped. Customers, who used the printer in a trial fashion, can not understand whey it is not possible to print out a demo page and have a bad impression. On the other hand, when the printer notifies that there is an error during a period when an error occurs, the error occurrence is notified until a sales person restores the printer from the error, and bad impressions are given to the customers.

Aspects of the present invention provide an image forming apparatus which does not give a bad impression to a customer even if an error occurs, such as the apparatus running out of sheets, and which can be easily used by a next customer.

According to an aspect, there is provided an image forming apparatus including: a printing unit that performs a printing operation for printing an image on a recording medium; a printing possibility determination unit that determines whether printing of an image is possible, at the time of starting the printing operation; a printing stop unit that stops the printing operation, when the printing possibility determination unit determines that printing of an image is impossible; a notification unit that notifies an error, when the printing operation is stopped by the printing stop unit; a notification time counting unit that counts a period in which an error is notified by the notification unit; a notification release unit that releases error notification of the notification unit, when the period in which an error is notified by the notification unit is counted for a predetermined time; and a stopped state reset unit that returns a stopped state of the printing unit whose printing operation is stopped, to a standby state before the printing unit performs the printing operation, when notification of an error is released by the notification release unit.

According to the aspect, even when printing by the image forming apparatus is not possible due to a matter, such as a recording medium has run out etc., an error is notified by the notification unit. Therefore, customers can know that the apparatus is in a state in which printing is not possible. In addition, notification by the notification unit is released after lapse of a predetermined time, and the printing unit is returned to a standby state at that time. Therefore, the image forming apparatus is not continuously stopped, and the error occurrence is not continuously notified throughout a period until a sales person solves the error. Thus, a bad impression is not given to customers.

BRIEF DESCRIPTION OF THE DRAWINGS

These and other objects and advantages of the present invention will be more fully apparent from the following detailed description taken in conjunction with the accompanying drawings, in which:

FIG. 4 is a setting list of printing modes; and

DETAILED DESCRIPTION OF THE ILLUSTRATIVE ASPECTS

Figure 1:
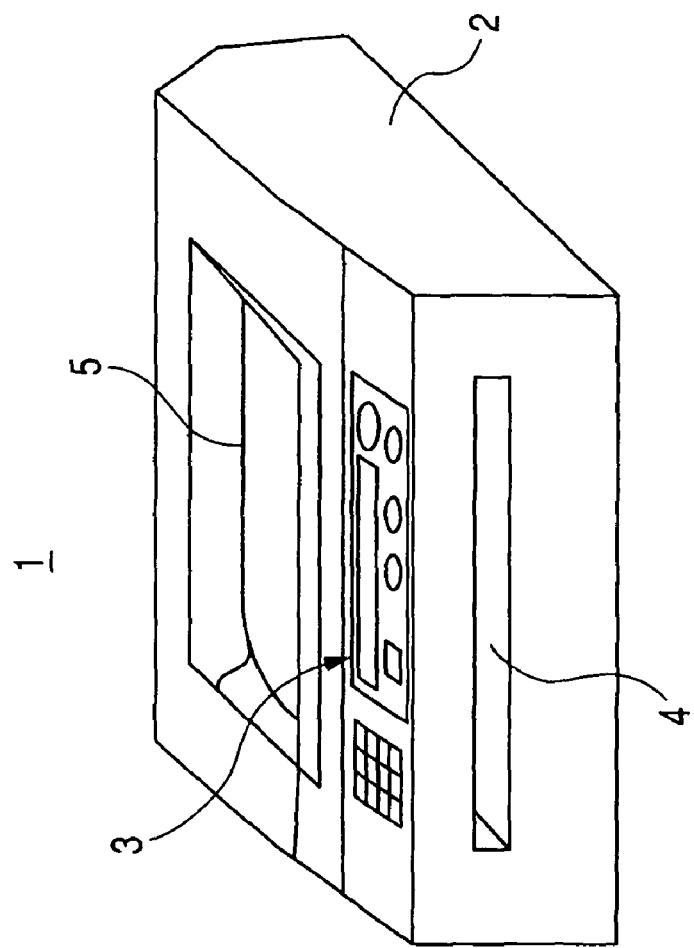
FIG. 1 is an external appearance view, which shows one aspect of a laser printer.
Figure 2:
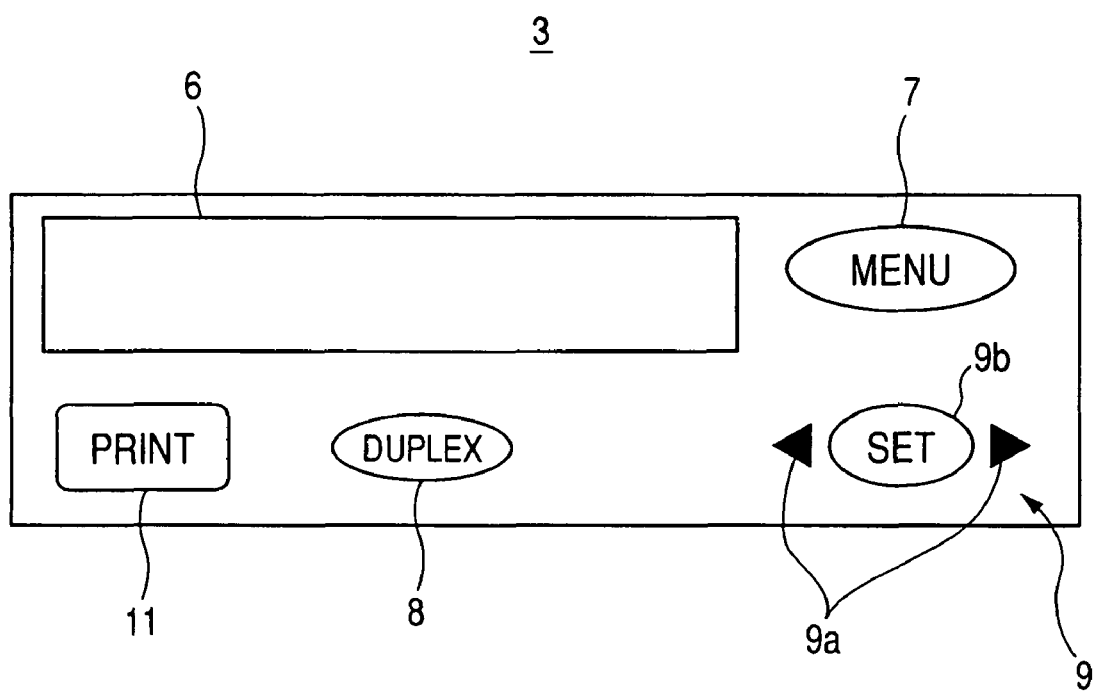
FIG. 2 is an enlarged view, which shows the vicinity of an operation unit of a main body case of the laser printer.

First, an external appearance of a laser printer 1 as an image forming apparatus of the present invention will be explained with reference to FIG. 1. FIG. 1 is an external appearance view which shows an aspect of the laser printer 1. FIG. 2 is an enlarged view which shows the vicinity of an operation unit 3 of a main body case 2 of the laser printer 1.

An operation unit 3 is disposed on an upper surface of the main body case 2 of the laser printer 1. In addition, a sheet feed tray 4 is a sheet feeding unit by which a sheet P is fed at the time of printing a demonstration use image on the sheet P, as a recording medium. The printed sheet P is ejected through a sheet ejection exit 5. The operation unit 3 is, as shown in FIG. 2, composed of a liquid crystal panel 6 as a notification unit for displaying a list of printing modes at the time of printing an image on the sheet P and displaying, such an error notification as a notification that there are no sheets if the sheet P is not fed to the sheet feed tray 4, a menu key 7 for displaying the list of printing modes on the liquid crystal panel 6 and selecting a mode, a duplex printing key 8 for selecting a mode of printing an image on both surfaces of the sheet P, a set key for deciding a printing mode, and a print key 11 for starting printing of an image to the sheet P in the set printing mode. The menu key 7, duplex printing key 8, set key 9 (collectively called as "printing mode set keys 7 through 9") are comparable to a printing mode setting unit in the present invention, and are operated at the time of a standby state before a printing unit 16, which will be described later, performs a printing operation for printing out an image on the sheet P.

Next, an internal control configuration of the laser printer 1 will be explained with reference to a block diagram of FIG. 3, which represents an internal control configuration of the laser printer 1.

Figure 3:
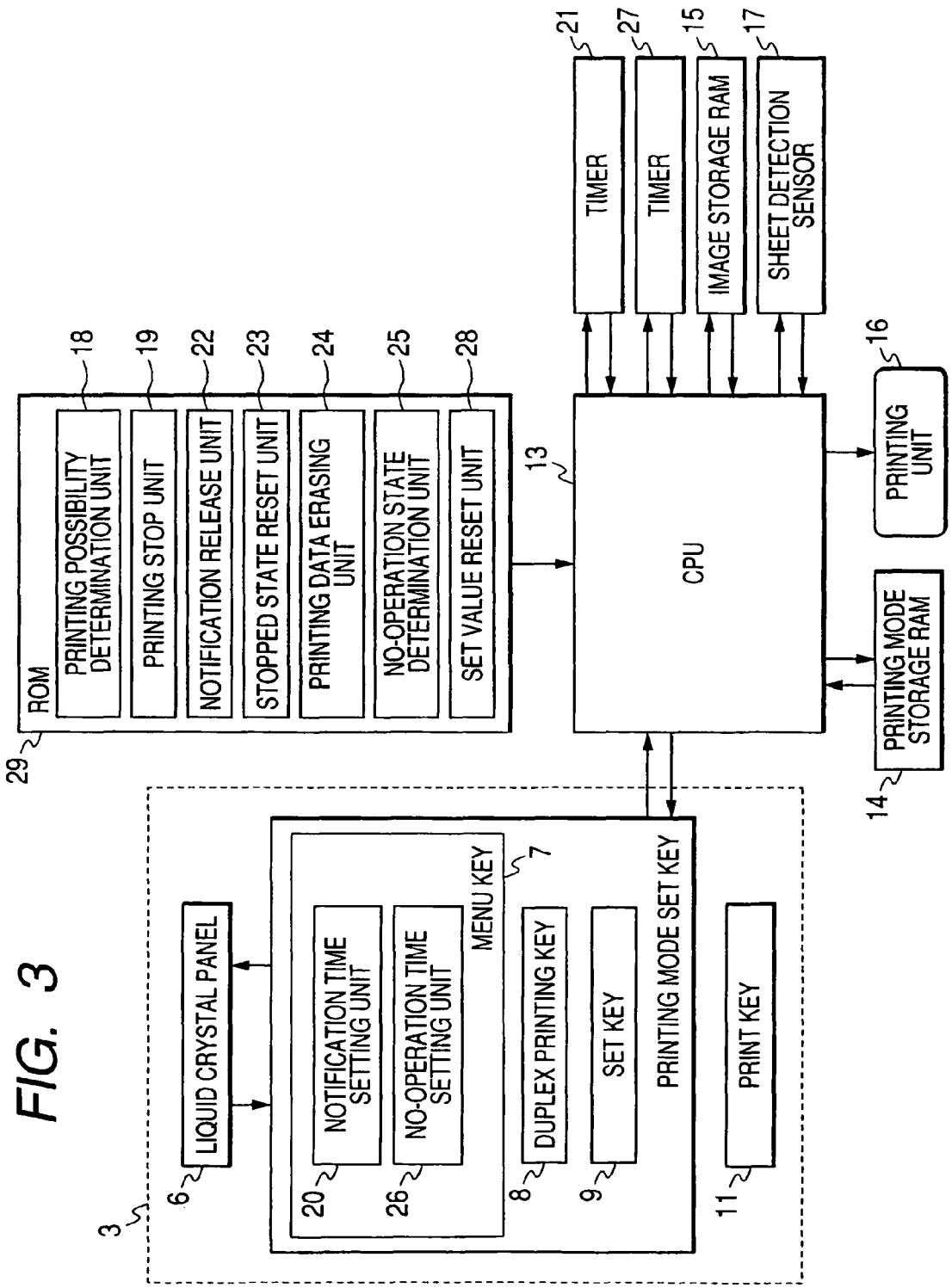
FIG. 3 is a block diagram, which represents a controlled internal configuration of the laser printer.

As shown in FIG. 3, the laser printer 1 includes the operation unit 3; a printing mode storage RAM 14, which stores a printing mode set by the above-described printing mode set keys 7 through 9; a CPU 13, which is operated in accordance with various programs; an image storage RAM as a storage unit, in which image data is stored; a printing unit 16, which prints out image data stored in the image storage RAM 15 based on a printing mode stored in the printing mode storage RAM 14; a sheet detection sensor 17 as a recording medium detection unit, which is disposed on the sheet feed tray 4 and detects the sheet P by coming into contact with the sheet P; timers 21 and 27 as a notification time counting unit and a no-operation time counting unit, respectively, which will be described later; and ROM 29, which has various programs to be executed by the CPU 13.

The operation unit 3 includes the liquid crystal panel 6 and the printing mode set keys 7 through 9. The menu key 7 includes a notification time setting unit 20 as a notification time setting unit, which sets the period that an error notification showing that there is no sheet P in the sheet feed tray 4 is displayed by the operation panel 6, and a no-operation time setting unit 26 as a no-operation time setting unit which sets a period in which it is determined that the printing mode set keys 7 through 9 are in a no-operation state.

ROM 29 includes programs for a printing possibility determination unit 18, a printing stop unit 19, a notification release unit 22, a stopped state reset unit 23, a printing data erasing unit 24, a no-operation state determination unit 25 and a set value reset unit 28.

The printing possibility determination unit 18 receives a detection signal, which differs based on whether or not the sheet P was detected by the sheet detection sensor 17. The printing possibility determination unit 18 determines whether the sheet P exists in the sheet feed tray 4 and printing is possible or the sheet P does not exist in the sheet feed tray 4 and printing is impossible based on the received detection signal.

The printing stop unit 19 stops a printing operation, i.e., driving of various constituent elements of the printing unit 16, when it is determined by the printing possibility determination unit 18 that the sheet P does not exist in the sheet feed tray 4 and printing is impossible.

The notification release unit 22 releases display of an error by the liquid crystal panel 6 when a printing operation is stopped by the printing stop unit 19 and a period, which is set by the notification time setting unit 20, in which an error notification is displayed is counted by the timer 21.

The stopped state reset unit 23 returns the printing unit 16 to a stopped state, in which printing operation is stopped to a standby state, before the printing unit 16 performs the printing operation.

The printing data erasing unit 24 erases image data from the image storage RAM 15 when display of an error notification is released by the notification release unit 22.

The no-operation state determination unit 25 determines whether the laser printer is in a no-operation state based on the operation of the printing mode set keys 7 through 9.

The set value reset unit 28 returns the setting in a printing mode, which is stored in the printing mode storage RAM 14, to factory shipment setting the printing mode set keys 7 through 9 are in a no-operation state for a time period counted by the timer 27, etc.

A CPU 13 is operated in accordance with the above programs.

Next, a printing mode of a demonstration use image will be explained by referring to FIG. 4. FIG. 4 is a setting list of printing modes. The above-described printing mode set keys 7 through 9 are used to set a printing mode of an image in the laser printer 1 of a demo machine which is placed in the store. The printing mode keys 7 through 9, i.e., the menu key 7, the duplex printing key 8, the set key 9, and the print key 11, have the following roles, respectively.

When the menu key 7 is depressed, a printing mode setting list as shown in FIG. 4 is displayed on the liquid crystal panel 6 one line by one line. Meanwhile, in FIG. 4, what is shown by a bold type is a factory shipment set value which is set as initial setting when the laser printer 1 is shipped from a factory.

Printing modes are roughly classified into three pieces, and are composed of "Paper" which is setting relating to the sheet P, "Quality" which is setting relating to an image which is printed out on the sheet P, and "Setup" which relates to other operations of the laser printer 1.

In "Paper", it is possible to set "Duplex" for setting duplex printing in which a long edge side of the sheet P can be bound (On (Long Bind)), duplex printing in which a short edge side of the sheet P can be bound (On (Short Bind)), or turning Off the duplex printing.

In "Quality", it is possible to set "Resolution" for setting resolution of an image to be printed out, such as printing by 300 dpt or printing by 600 dpt, and to set "Toner Save" for setting whether a toner, which is used for printing of an image, is saved or not, by On/Off.

In "Setup", it is possible to set "Language" for setting a language (English, Japanese, French, German) displayed on the liquid crystal panel 6, "Error Buzzer" for setting On/Off of an error buzzer which notifies an error by sounding in case that there occurred an error of no-sheet, "Buzzer Volume" for setting a sound volume of the buzzer, by Low/High, in case of sounding the error buzzer, and "Error Alarm Time" for setting time $t_1$=m of notifying a no-sheet error through the use of the liquid crystal panel 6 and the buzzer, by the notification time setting unit 20, "No-Touch Time" for setting time $t_2$=n which is in a no-operation state in which the printing mode set keys 7 through 9 are not operated by the no-operation time setting unit 26, and so on.

Then, every time that the menu key 7 is depressed, the above-described setting items, which are displayed on the liquid crystal panel 6, are switched over sequentially. For example, when the menu key 7 is depressed once at the time that "Resolution=300/600 dpi" is displayed on the liquid crystal panel 6, it is switched over to display of "Toner Save=Off/On".

The duplex printing key 8 is an exclusive use key which is used at the time of setting "Duplex" of "Paper" shown in FIG. 4, and every time it is depressed once, display of the liquid crystal panel 6 is switched from "Off", "On (Long Bind)", and "On (Short Bind)".

The set key 9 is a key for changing and deciding setting of a printing mode which was selected by the menu key 7 and the duplex printing key 8. For example, in case that "Resolution=300/600 dpi" of "Quality" was selected by the menu key 7, it is selected by a selection key 9*a* whether 300 dpi is set or 600 dpi is set, and it is decided by a decision key 9*b* in order to print out an image on the sheet P with a solution selected by the selection key 9*a*. The printing mode, which was selected by the menu key 7 and set by the set key 9, is stored in the printing mode storage RAM 14 until the no-sheet error is notified by the buzzer for the time $t_2=m$, the printing time set keys 7 through 9 are not operated for the time $t_2=n$, or setting is changed by operating the printing mode set keys 7 through 9 next time.

The print key 11 is a key which is depressed at the time of starting demonstration use image printing onto the sheet P by the printing unit 16, on the basis of a printing mode set by the menu key 7, the duplex printing key 8 and the set key 9. When the print key 11 is depressed, a signal, which shows that the key 11 was depressed, is transmitted to the CPU 13, and the CPU 13, which received this signal, outputs an instruction to the printing mode storage RAM 14 so as to transmit a stored printing mode. Then, the CPU 13 sends demonstration use image data which has been stored in the image storage RAM 15 to the printing unit 16, together with the printing mode obtained from the printing mode storage RAM 14, and the printing unit 16 stars printing of an image onto the sheet P.

Figure 5:
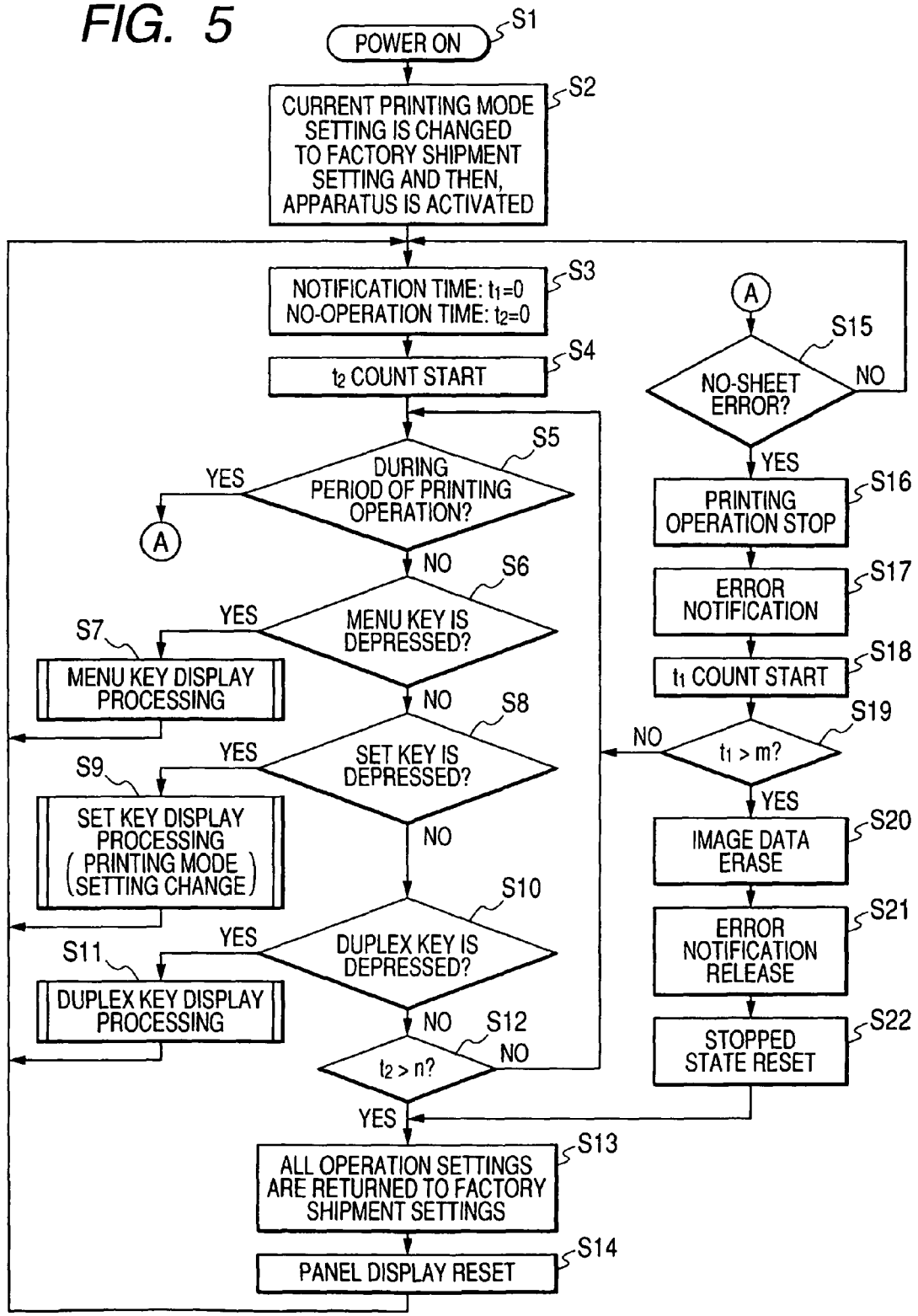
FIG. 5 is a flow chart, which shows processing operations of a CPU at the time of error occurrence and relating to setting of a printing mode.

Next, processing operations at the time of occurrence of an error that the sheet P does not exist in the sheet feed tray 4, and relating to a printing mode for which setting is changed depending on a state of the laser printer 1, will be explained by referring to FIG. 5. FIG. 5 is a flow chart which shows processing operations of the CPU 13 at the time of error occurrence and relating to setting of a printing mode.

First, before a store is opened, etc., a sales person turns ON a power supply of the demonstration use laser printer 1 (S1) When the power supply of the laser printer 1 is turned ON, a printing mode is set to factory shipment setting, and the laser printer 1 is activated (S2). When the laser printer 1 is activated, a count value $t_1$ of the timer 21, which counts time of notifying a no-sheet error, and a count value $t_2$ of the timer 27, which counts time of a no-operation state in which the printing mode set keys 7 through 9 are not operated, are set to $t_1=0$ and $t_2=0$ (S3). When setting of $t_1=0$ and $t_2=0$ is carried out, the timer 27 starts counting the time $t_2$ of the no-operation state in which the printing mode set keys 7 through 9 are not operated (S4). When counting of $t_2$ is started, image data, which was stored in the image storage RAM 15, is read out, and it is determined whether the printing unit 16 is in a period of a printing operation in which its drive was started (S5). When it is determined that the printing unit 16 stops a printing operation (S5:No), it is determined by the no-operation state determination unit 25 whether the menu key 7 is operated (S6). When it is determined that the menu key 7 was operated (S6:Yes), the liquid crystal panel 6 performs display processing of the time that the menu key 7 was operated (S7). After processing of S7, it goes back to processing of S3 in which the count values $t_1$, $t_2$ are set to $t_1=0$ and $t_2=0$. When it is determined that the menu key 7 is not operated (S6: No), it is determined by the no-operation state determination unit 25 whether the set key 9 was operated (S8). When it is determined that the set key 9 was operated (S8:Yes), the liquid crystal panel 6 performs display processing of the time that the set key 9 was operated, and setting of a printing mode is changed (S9). After processing of S9, it goes back to processing of S3 in which the count values $t_1$, $t_2$ are set to $t_1=0$ and $t_2=0$. When it is determined that the set key 9 is not operated (S8: No), it is determined by the no-operation state determination unit 25 whether the duplex printing key 8 was operated (S10). When it is determined that the duplex printing key 8 was operated (S10: Yes), the liquid crystal panel performs display processing of the time that the duplex printing key 8 was operated (S11). After processing of S11, it goes back to processing of S3 in which the count values $t_1$, $t_2$ are set to $t_1=0$ and $t_2=0$. When it is determined that the duplex printing key 8 is not operated (S10:No), it is determined whether the count value $t_2$ of the timer 27 is $t_2>n$ (S12). When it is determined that the count value $t_2$ of the timer 27 is not $t_2>n$ (S12:No), it goes back to processing of judging whether the printing unit 16 is in a period of a printing operation in S5. When it is determined that the count value $t_2$ of the timer 27 is $t_2>n$ (S12:Yes), setting of all printing modes is returned to factory shipment setting shown by a bold type of FIG. 4 at the time that the laser printer 1 is shipped from a factory, by the set value reset unit 28 (S13). When setting of all printing mode is returned to factory shipment setting, display of the liquid crystal panel 6 is returned to initial display prior to operating the printing mode set keys 7 through 9 (S14), and it goes back to processing of S3 in which the count values $t_1$, $t_2$ are set to $t_1=0$ and $t_2=0$.

On the one hand, when it is determined that the printing unit 16 is in a period of a printing operation (S5:Yes), it moves into processing from A shown in FIG. 5, and on the basis of a detection signal from the sheet detection sensor 17, it is determined by the printing possibility determination unit 18 whether it is in such a state that the sheet P does not exist in the sheet feed tray 4 and printing is impossible (S15). When it is determined that the sheet P exists in the sheet feed tray 4 and printing is possible (S15: No), the printing unit 16 continues a printing operation, and it goes back to processing of S3 in which the count values $t_1$, $t_2$ are set to $t_1=0$ and $t_2=0$. When it is determined that the sheet P does not exist in the sheet feed tray 4 and printing is impossible (S15:Yes), a printing operation of the printing unit 16 is stopped by the printing stop unit 18 (S16). Then, an error notification of "No Sheet Print Impossible" etc. is displayed on the liquid crystal panel 6, and if "Error Buzzer" of "Setup" shown in FIG. 4 is set to ON, an error is notified by sounding of the buzzer (S17). Processing of S17 is carried out, and the timer 21 starts counting the time $t_1$ of notifying a no-sheet error (S18). When counting of the error notification time $t_1$ is started, it is determined whether the count value $t_1$ of the timer 21 is $t_1>m$ set by the notification time setting unit 20 (S19). When it is determined that the count value $t_1$ of the timer 21 is not $t_1>m$ (S19:No), it goes back to processing of judging whether the printing unit 16 is in a period of a printing operation in S5. When it is determined that the count value $t_1$ of the timer 21 is $t_1>m$ (S19:Yes), image data, which is scheduled to be printed out, is erased from the image storage RAM 15, by the printing data erasing unit 24 (S20). When image data is erased, error notification of no-sheet through the use of the liquid crystal panel 6 and the buzzer is released by the notification release unit 22 (S21). When error notification is released, the printing unit 16 is returned from a stopped state in which a printing operation was stopped, to a standby state before the printing unit 16 starts a printing operation, by the stopped state reset unit 23 (S22). When the printing unit 16 is returned from the stopped state to the standby state, setting of all printing mode is returned to factory shipment setting by the set value reset unit 28 (S13). When setting of all printing modes is returned to factory shipment setting, display of the liquid crystal panel is returned to initial display prior to operating the printing mode set keys 7 through 9 (S14), and it goes back to processing of S3 in which the count values $t_1$, $t_2$ are set to $t_1=0$ and $t_2=0$.

If the above-described processing is not disposed, an error is notified by the liquid crystal panel 6 and the buzzer, at the time of when the sheet P does not exist in the sheet feed tray 4 and demonstration use printing by the laser printer 1 is impossible, and therefore, customers know that the laser printer 1 is in such a state that it can not carry out printing. Then, notification of the no-sheet error is released by the notification release unit 22 after the lapse of the notification time $t_1=m$ which was set by the notification time setting unit 20, and at that time the printing unit 16 is returned to a standby state by the stopped state reset unit 23. Therefore, there is not a case in which the laser printer 1 is continuously stopped and the error is continuously notified throughout a period until a sales person puts sheets P in the sheet feed tray 4 and a bad impression is given to customers.

In addition, it is possible to freely set a period of notifying the no-sheet error by the notification time setting unit 20. Therefore, it is possible to set an optimum notification period based on the number of customers who came to the store, etc.

In the demonstration use laser printer 1 which is placed at the store, even if printing data, which could not be printed out due to an error, is stored in the image storage RAM 15 and is printed out at the time that the printer is restored from the error, a customer, who came to the store and tried to print out the data at that time, often departs from the store and does not want it would rather the data to printed out. Then, according to the printing data erasing unit 24, it is possible to automatically erase printing data, which can not be printed out due to an error and for which the need was eliminated, from the image storage RAM 15.

When a no-operation state, in which the printing mode set keys 7 through 9 are not operated, continues until the time $t_2=n$ which was set by the no-operation time setting unit 26, the set value reset unit 28 returns setting of a printing mode to the factory shipment setting. Therefore, even if a customer, who uses the laser printer 1 in a trial fashion, changes the setting of a printing mode and then leaves the store without resetting the printing mode, another customer who uses the image forming apparatus next time can easily set a printing mode and print out a demonstration use image.

As above, the present invention was explained with respect to the above-described aspects, but the present invention is not limited to the above-described aspect, and various improvements and modifications are possible that do not depart from its technical concept.

In the above-described aspects, the printer provides a notification that the sheet P does not exist in the sheet feed tray 4 by the liquid crystal panel 6 and the buzzer, and the error notification is released after the lapse of predetermined time. In addition, when it is impossible to continue a printing operation, such as if the sheet P is jammed in a sheet carrying path (not shown in the figure) through which the sheet P is fed from the sheet feed tray 4 and ejected from the sheet ejection exit 5 after an image is printed out in the printing unit 16, or a toner for printing image data on the sheet as a visible image runs out, the notification by the liquid crystal panel 6 and the buzzer as described above is used, and error notification is released after the lapse of predetermined time.

An error can be notified by not only the liquid crystal panel 6 and sounding of the buzzer, but also by lighting or blinking of a light emitting diode.

An image forming apparatus such as a ink jet printer, a facsimile apparatus, and a complex machine having both a print function and a facsimile function together, without applying only to the laser printer 1, can carry out the processing described in the above-mentioned aspects as a demonstrations use image forming apparatus.

According to the aspects, it is possible to freely set a notification period. Therefore, it is possible to set an optimum notification period based on the number of persons who came to the store, etc.

In a demonstration use image forming apparatus, a customer may not prefer that printing data, which could not be printed out due to an error, is stored and is printed out at the time that it is restored from the error. That is, a customer, who came to the store and tried to print out data at that time, often departs from the store. Therefore, the customer would prefer that the data not be printed out. Therefore, according to the image forming apparatus, it is possible to automatically erase printing data which could not be printed out due to an error and for which the need was eliminated.

According to the aspects, an error is notified by the notification unit even when printing by the image forming apparatus is not possible due to a recording medium running out. Therefore, customers can know that there is no recording medium in the image forming apparatus and printing is not possible.

According to the aspects, when a no-operation state continues for a predetermined time, the set value reset unit returns a set value in a printing mode to a factory shipment set value which was set at the time that the image forming apparatus is manufactured and shipped from a factory. Therefore, even if a previous customer, who came to the store and used the image forming apparatus in a trial fashion, changed setting in a printing mode and then left the store, another customer, who comes to the store and uses the image forming apparatus next can easily prints out a demonstration use image and set a printing mode.

According to the aspects, it is possible to freely set a time period which is counted by the no-operation time counting unit and which is determined as a no-operation state. Therefore, it is possible to set an optimum no-operation period based on the number of customers who came to the store, etc.

What is claimed is:

1. An image forming apparatus comprising:
    a printing unit configured to perform a printing operation for printing an image on a recording medium according to a printing mode;
    a printing possibility determination unit configured to determine whether printing of an image is possible, at the time of starting the printing operation;
    a printing stop unit configured to stop the printing operation, when the printing possibility determination unit determines that printing of an image is impossible;
    a notification unit configured to create an error notification when the printing operation is stopped by the printing stop unit;
    a notification time counting unit configured to count a period in which the error is notified by the notification unit;
    a notification release unit configured to release the error notification of the notification unit, when the period in which an error is notified by the notification unit is counted for a first predetermined time;
    a stopped state reset unit configured to return from a stopped state of the printing unit whose printing operation is stopped, to a standby state before the printing unit performs the printing operation, when the error notification is released by the notification release unit;
    an operation unit configured to allow a user to set the printing mode for the printing unit in the standby state before the printing unit performs the printing operation;
    a no-operation state determination unit configured to determine whether the operation unit is operated to set the printing mode;
    a no-operation time counting unit configured to count a period in which the operation unit is not operated to set the printing mode; and
    a set value reset unit configured to return a set value of the printing mode to a predetermined value when the period in which the operation unit is not operated is counted for a second predetermined time and when there has been no error.

2. The image forming apparatus according to claim 1, further comprising:
a notification time setting unit that sets the period, which is counted by the notification time counting unit, and in which an error is notified.

3. The image forming apparatus according to claim 1, further comprising:
a storage unit that stores the printing data for printing an image by the printing unit; and
a printing data erasing unit that erases printing data from the storage unit, when notification of an error is released by the notification release unit.

4. The image forming apparatus according to claim 1, further comprising:
a feeding unit that feeds a recording medium; and
a recording medium detection unit that detects whether a recording medium is fed to the feeding unit, wherein
when the recording medium detection unit detects that a recording medium is not fed to the feeding unit, the printing possibility determination unit determines that printing of an image is impossible, and an error with respect to no recording medium is notified by the notification unit.

5. The image forming apparatus according to claim 1, further comprising:
a no-operation time setting unit that sets a period, which is counted by the no-operation time counting unit and is determined as the no-operation state.

6. The image forming apparatus according to claim 1, wherein the predetermined value is a factory shipment set value.

7. An image forming apparatus comprising:
an operation unit configured to allow a user to input and set a printing mode in a standby state;
a printing unit configured to perform a printing operation for printing an image on a recording medium according to the printing mode set by the operation unit in the standby state;
a printing possibility determination unit configured to determine whether printing of an image is possible, at the time of starting the printing operation;
a printing stop unit configured to stop the printing operation, when the printing possibility determination unit determines that printing of an image is impossible;
a notification unit to create an error notification when the printing operation is stopped by the printing stop unit;
a notification time counting unit configured to count a period in which an error is notified by the notification unit;
a notification release unit configured to release the error notification of the notification unit, when the period in which an error is notified by the notification unit is counted for a first predetermined time;
a stopped state reset unit configured to return from a stopped state of the printing unit whose printing operation is stopped to the standby state when notification of an error is released by the notification release unit;
a no-operation state determination unit configured to determine whether the operation unit is operated;
a no-operation time counting unit configured to count a period in which the operation unit is not operated; and
a set value reset unit configured to return a set value of the printing mode to a predetermined value (i) when the stopped state reset unit returns from the stopped state of the printing unit to the standby state, (ii) when the printing unit finishes the printing operation according to the set printing mode and there has been no error, and (iii) when the period in which the operation unit is not operated is counted for a second predetermined time different from the first time period.

8. The image forming apparatus according to claim 7, wherein the predetermined value is a factory shipment set value.

9. An image forming apparatus comprising:
a printing unit configured to perform a printing operation for printing an image on a recording medium according to a printing mode and configured to stand-by in a standby state;
a notification unit configured to create an error notification when the printing operation is stopped by the printing stop unit;
a notification time counting unit configured to count a period in which the error is notified by the notification unit;
an operation unit configured to allow a user to set the printing mode for the printing unit in the standby state before the printing unit performs the printing operation;
a no-operation time counting unit configured to count a period in which the operation unit is not operated to set the printing mode;
a processor; and
a computer readable storage in which computer-executable program units are stored including:
a printing possibility determination unit configured to determine whether printing of an image is possible, at the time of starting the printing operation;
a printing stop unit configured to stop the printing operation, when the printing possibility determination unit determines that printing of an image is impossible;
a notification release unit configured to release the error notification of the notification unit, when the period in which an error is notified by the notification unit is counted for a first predetermined time;
a stopped state reset unit configured to return from a stopped state of the printing unit whose printing operation is stopped, to a standby state before the printing unit performs the printing operation, when the error notification is released by the notification release unit;
a no-operation state determination unit configured to determine whether the operation unit is operated to set the printing mode;
a set value reset unit configured to return a set value of the printing mode to a predetermined value when the period in which the operation unit is not operated is counted for a second predetermined time and when there as been no error.

10. The image forming apparatus according to claim 9, further comprising:
a notification time setting unit that sets the period, which is counted by the notification time counting unit, and in which an error is notified.

11. The image forming apparatus according to claim 9, further comprising:
a storage unit that stores the printing data for printing an image by the printing unit; and
a printing data erasing program unit that erases printing data from the storage unit, when notification of an error is released by the notification release unit.

12. The image forming apparatus according to claim 9, further comprising:

a feeding unit that feeds a recording medium; and a recording medium detection unit that detects whether a recording medium is fed to the feeding unit, wherein when the recording medium detection unit detects that a recording medium is not fed to the feeding unit, the printing possibility determination unit determines that printing of an image is impossible, and an error with respect to no recording medium is notified by the notification unit.

13. The image forming apparatus according to claim 9, further comprising:

a no-operation time setting unit that sets a period, which is counted by the no-operation time counting unit and is determined as the no-operation state.

14. The image forming apparatus according to claim 9, wherein the predetermined value is a factory shipment set value.

\* \* \* \* \*